Dec. 18, 1951  H. V. HAGELY  2,578,972
TRAILER TRACTOR CHASSIS ADJUSTING DEVICE
Filed Aug. 31, 1950  2 SHEETS—SHEET 1
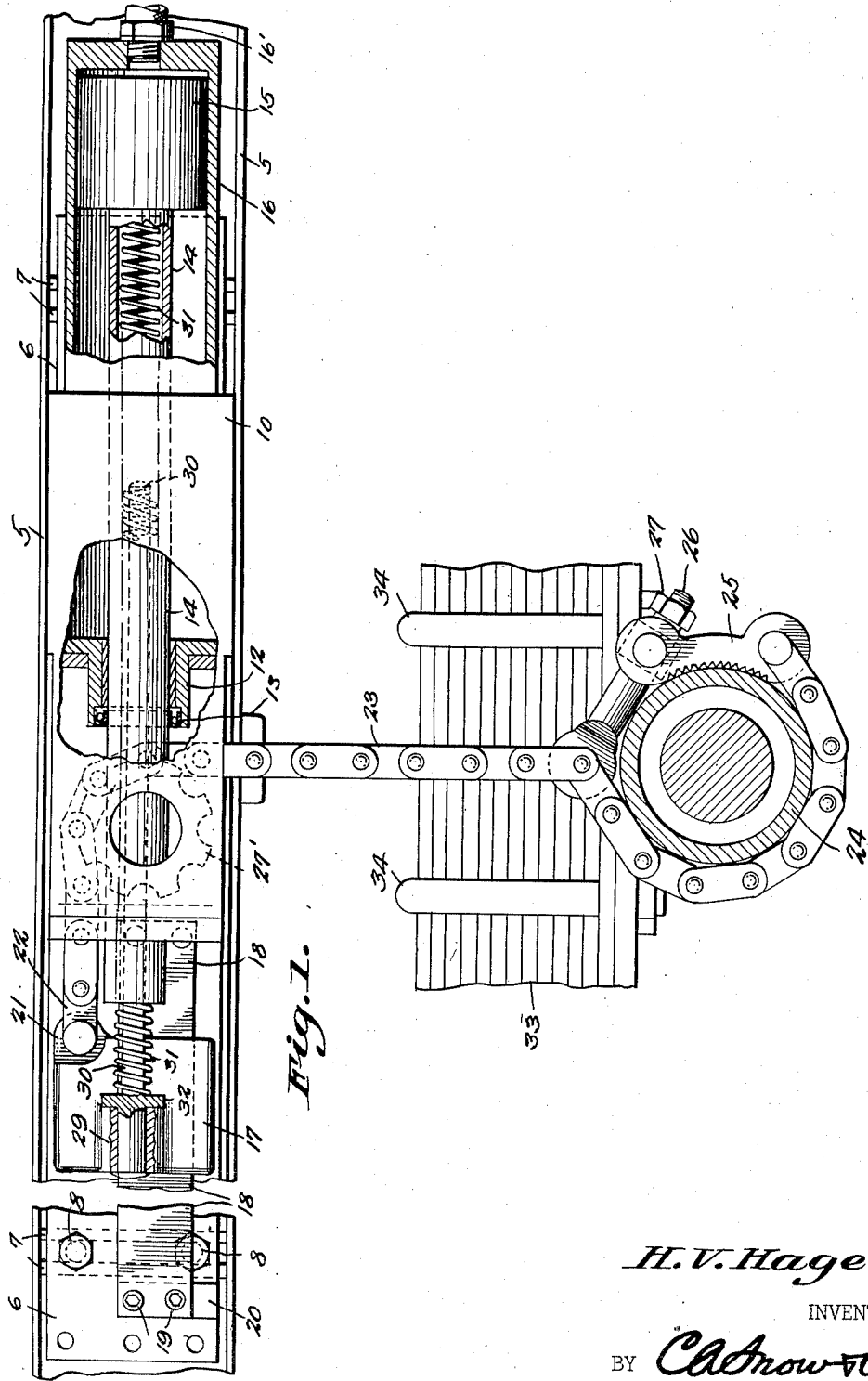
H. V. Hagely
INVENTOR
BY
ATTORNEYS.

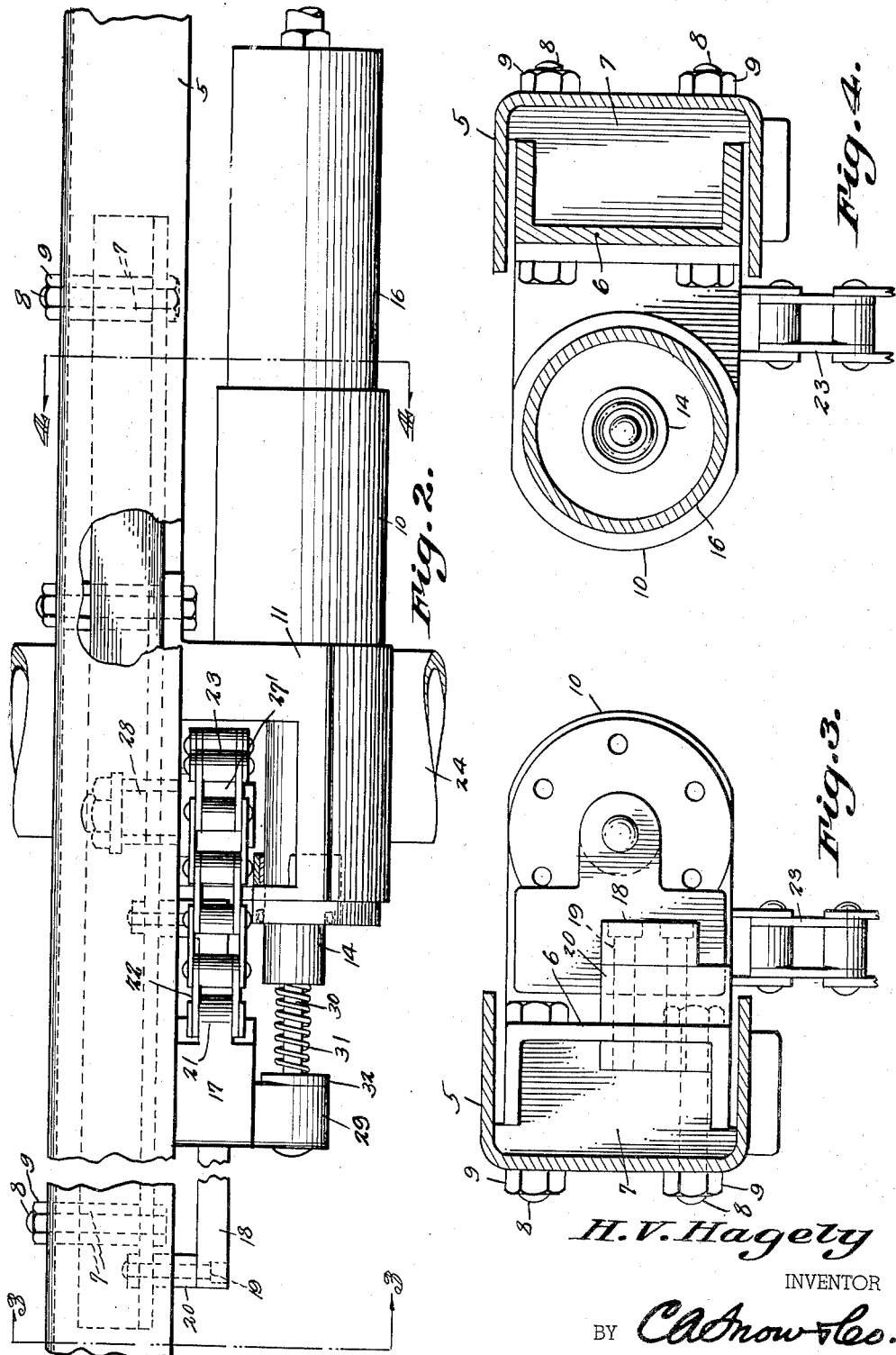

UNITED STATES PATENT OFFICE 2,578,972

TRAILER TRACTOR CHASSIS ADJUSTING DEVICE

Herbert V. Hagely, East St. Louis, Ill.

Application August 31, 1950, Serial No. 182,605

3 Claims. (Cl. 280—44)

By way of explanation, it might be stated that frequently when tractor drawn trailers are loaded, the weight of the load will depress the chassis of the trailer with respect to the running gear or rear axle thereof, to such a degree that the coupling of the tractor to the trailer is rendered difficult, and frequently impossible, without damaging the tractor trailer coupling device.

It is therefore the primary object of the invention to provide a device in the form of an attachment which may be readily and easily installed on the usual trailer tractor whereby the chassis of the trailer tractor may be lowered and maintained in the lowered position so that the coupling or fifth wheel structure between the trailer and tractor, or the sections thereof, will align and permit of ready coupling of the tractor and trailer.

Another object of the invention is to provide a device of this character which may be hydraulically operated from a hydraulic system which may be installed as a part of the mechanism of the trailer tractor, or a hydraulic system used as a part of a garage or building equipment.

Another important object of the invention is to provide a lowering device of this character including a chain for transmitting movement of the chassis with respect to the running gear, to draw the chassis towards the running gear, means being provided for maintaining the chain taut to prevent slapping of the chain while the trailer tractor is in motion.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Figure 1 is an elevational view illustrating a device constructed in accordance with the invention showing the device as applied between the chassis and running gear of a tractor.

Fig. 2 is a plan view thereof.

Fig. 3 is a sectional view taken on line 3—3 of Fig. 2.

Fig. 4 is a sectional view taken on line 4—4 of Fig. 2.

Referring to the drawings in detail, the reference character 5 indicates the side rail of a chassis of a trailer tractor, to which the device forming the subject matter of the present invention is secured. The device comprises a support in the form of a channel bar 6 which is positioned within the open side of the side rail 5 of the chassis, as clearly shown by Fig. 4 of the drawings.

The channel bar 6 is held in spaced relation with the inner surfaces of the side rail 5 of the chassis to which it is secured, by means of the spacers 7 and bolts 8 which extend through the side rail 5 and channel bar 6, the bolts being provided with nuts 9 for securing the channel bar 6 within the side rail 5.

The reference character 10 indicates a cylindrical housing which is mounted in the bracket 11, the cylindrical housing 10 having an extension 12 formed with a seal ring 13, through which the hollow shaft 14 operates, the shaft 14 being secured to the inner end of the piston 15 to move therewith. The piston 15 operates in the cylinder 16 formed at one end of the cylindrical housing 10, as clearly shown by Fig. 1 of the drawings.

An opening is formed in the end of the cylinder 16, and the pipe 16', from the hydraulic system not shown, connects therewith, to supply fluid to the cylinder to operate the piston 15. This hollow shaft 14 operates through the seal ring 13 and moves against spring 31 compressing the spring until the end of the shaft 14 contacts the stop 32 moving the stop and block 17 on which the stop is mounted. Secured to the channel bar 6, is a guide bar 18 which is held in place by means of the bolts 19, there being provided spacers 20 to hold the guide bar 18 in proper spaced relation with respect to the channel bar 6.

The block 17 is provided with a rectangular opening to accommodate the guide bar 18, and over which the block 17 moves. The block 17 is formed with an ear 21, to which the end link 22 is pivotally connected, the link 22 forming a part of the chain 23 which is wrapped around the axle housing 24 forming a part of the running gear of the trailer tractor, the chain being provided with the clamp bar 25 which has teeth that bite into the axle housing, the clamp bar 25 being drawn into close engagement with the axle housing 24, by means of the bolt 26 that connects with the length of chain, intermediate its ends, with one end of the bolt passing through an opening formed in the clamp bar, where the bolt is provided with the nut 27 which may be operated to tighten or loosen the clamp.

The reference character 27' indicates a sprocket that is supported on the bolt 28 which extends laterally from the channel bar 6, as clearly shown by Fig. 2 of the drawings.

The chain 23 operates over this sprocket 27' when the device is operated to lower the chassis of the tractor.

As shown by Fig. 2 of the drawings, the block 17 is provided with a lateral extension 29 to which the rod 30 is secured, the rod 30 being of a length to extend an appreciable distance within the hollow shaft 14 where it is surrounded by the coiled spring 31 which is of a length to extend from the piston 15, throughout the length of the hollow shaft 14, the outer end of the spring 31 resting against the stop 32 which is secured or formed on the rod 30, adjacent to the extension 29.

The springs of the running gear of the tractor, are indicated by the reference character 33 and these springs are secured to the axle housing 24, in the usual manner, as by means of the U bolts 34.

In the operation of the device, assuming that a tractor which is equipped with the lowering device, constructed in accordance with the invention, is to be coupled to a loaded trailer wherein the weight of the load on the trailer has lowered the chassis of the trailer with respect to the running gear thereof, to such an extent that the height of the tractor will not permit the tractor to be moved under the trailer to couple the trailer thereto; fluid from a hydraulic system is now admitted to the cylinder 16, through the pipe 16' which forces the piston 15 forwardly, compressing the spring 31 against the stop 32 which in turn, moves the block 17 forwardly with the result that the chain 23 is shortened, pulling the chassis of the tractor downwardly towards the running gear, consequently lowering the chassis and fifth wheel section carried by the chassis, so that the fifth wheel section may be moved to a position under the fifth wheel section carried by the trailer.

When the tractor has been properly coupled with the trailer, the fluid from the hydraulic system is allowed to exhaust from the cylinder 16. It is obvious that due to the action of the spring 31 and rod 30, the block 17 will be automatically moved longitudinally of the guide bar 18, as the running gear and chassis of the tractor move with respect to each incident to the wheels of the tractor moving over irregularities, thereby holding the chain taut and preventing flapping or excessive strains being directed to the chain to cause breakage of the chain.

From the foregoing it will be seen that due to the construction shown and described, I have provided means whereby the chassis of a trailer tractor may be lowered to permit the fifth wheel section carried by the tractor to be slid under the fifth wheel secion carried by the trailer to couple the tractor and trailer, after the trailer has been loaded to a degree to cause the chassis to move downwardly too close to the running gear to permit the tractor to be coupled to the trailer in the usual way.

Having thus described the invention, what is claimed is:

1. The combination with the chassis and running gear of a tractor, of a chassis adjusting device comprising a support secured to one side rail of the chassis, a block movable longitudinally of the support, a chain having one of its ends secured to the running gear, the opposite end of said chain being secured to said block, a piston operating at one end of the support, a hollow shaft extending from the piston, a guide rod connected with the block operating within said hollow shaft, a coiled spring disposed within the hollow shaft bearing against the piston and said block, said spring moving the block forwardly upon forward movement of said piston, compressing the spring, whereby said chain is operated drawing the chassis towards the running gear.

2. The combination with the chassis and running gear of a tractor, of a chassis adjusting device comprising a support secured to a side rail of the chassis, a block movable longitudinally of the support, a chain connected between the running gear and block, a cylinder and piston operating in the cylinder, mounted on the chassis, a hollow shaft connected with said piston, a spring within said hollow shaft, said spring bearing against said block moving the block and end of the chain connected therewith forwardly with forward movement of said block, pulling said chain whereby the chassis is drawn towards the running gear, and an idle sprocket over which the chain operates.

3. The combination with the chassis and running gear of a tractor, of a chassis adjusting device comprising a supporting member secured to the side rail of the chassis, a block mounted on the supporting member and being movable longitudinally of said supporting member, a piston mounted on the supporting member, a hollow shaft secured to the piston, the free end of the hollow shaft lying in spaced relation with said block, a guide rod extending from the block and moving into said hollow shaft, a coiled spring engaging said block and said piston, means for moving said piston tensioning said spring against said block whereby said block is moved longitudinally of the supporting member, a chain connected with the block, said chain being connected with the running gear whereby movement of the block shortens the chain drawing the chassis downwardly towards the running gear, and said coiled spring adapted to normally tension said chain holding said chain taut.

HERBERT V. HAGELY.

REFERENCES CITED

The following references are of record in the file of this patent:

UNITED STATES PATENTS

| Number | Name | Date |
| --- | --- | --- |
| 2,000,179 | Kuchar | May 7, 1935 |
| 2,000,229 | Heise | May 7, 1935 |
| 2,324,587 | Krogh | July 20, 1943 |